United States Patent
Shui

(10) Patent No.: US 9,467,801 B2
(45) Date of Patent: Oct. 11, 2016

(54) METHOD AND SYSTEM FOR ESTABLISHING A BLUETOOTH CONNECTION

(71) Applicant: Quanta Computer Inc., Taoyuan (TW)

(72) Inventor: Hsien-Yao Shui, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 14/615,990

(22) Filed: Feb. 6, 2015

(65) Prior Publication Data

US 2016/0073218 A1   Mar. 10, 2016

(30) Foreign Application Priority Data

Sep. 4, 2014  (TW) .............................. 103130525 A

(51) Int. Cl.
*H04B 7/00* (2006.01)
*H04W 4/00* (2009.01)
*H04W 76/02* (2009.01)

(52) U.S. Cl.
CPC ........... *H04W 4/008* (2013.01); *H04W 76/023* (2013.01)

(58) Field of Classification Search
CPC   H04W 4/008; H04W 76/023; A01B 12/006; H03H 9/205
USPC ...................... 455/41.1, 41.2, 41.3
See application file for complete search history.

(56) References Cited

U.S. PATENT DOCUMENTS

| 9,125,132 | B1* | 9/2015 | Rai | ........................ H04W 4/02 |
| 2007/0202807 | A1* | 8/2007 | Kim | ..................... H04B 5/0062 455/41.2 |
| 2012/0135683 | A1* | 5/2012 | Lee | ........................ H04L 63/101 455/41.2 |
| 2014/0094124 | A1* | 4/2014 | Dave | ..................... H04W 8/005 455/41.2 |
| 2015/0147970 | A1* | 5/2015 | Tan | ....................... H04W 12/08 455/41.2 |
| 2016/0028697 | A1* | 1/2016 | Shui | ..................... H04W 84/18 713/168 |
| 2016/0073218 | A1* | 3/2016 | Shui | .................... H04W 76/023 455/41.2 |

FOREIGN PATENT DOCUMENTS

SG   WO 2013191648 A1 * 12/2013 ............ H04W 12/08

* cited by examiner

*Primary Examiner* — Md Talukder
(74) *Attorney, Agent, or Firm* — McClure, Qualey & Rodack, LLP

(57) ABSTRACT

A method and device for establishing a Bluetooth connection are provided. The method includes: generating, by a first electrical device, a first part of a Bluetooth identifier according to a user's name and a Bluetooth network-card address; generating a second part of the Bluetooth identifier according to the first part of the Bluetooth identifier, a private key, and a first algorithm; generating the Bluetooth identifier according to the first part of the Bluetooth identifier and the second part of the Bluetooth identifier; generating a password according to the Bluetooth identifier, the private key and a second algorithm; transmitting, by a second electrical device, a Bluetooth pairing request according to the Bluetooth identifier, the private key, the first algorithm, and the second algorithm; and responding, by the first electrical device, the Bluetooth pairing request to establish the Bluetooth connection with the second electrical device.

10 Claims, 5 Drawing Sheets

METHOD AND SYSTEM FOR ESTABLISHING A BLUETOOTH CONNECTION

CROSS REFERENCE TO RELATED APPLICATIONS

This Application claims priority of Taiwan Patent Application No. 103130525, filed on Sep. 4, 2014, the entirety of which is incorporated by reference herein.

BACKGROUND OF THE INVENTION

1. Field of the Invention

The disclosure is related to establishing a Bluetooth connection, and, more particularly, to establishing a Bluetooth connection by a Bluetooth identifier and a password which are generated by a user's name and network card address.

2. Description of the Related Art

Recently, because of the rapid development of wireless communications, portable devices, such as smartphone, personal digital assistants, and tablet PCs, are available, and have become more and more technically advanced and multifunctional. Due to increased convenience and functions of the devices, these devices have become necessities of life.

A user may utilize the electrical devices or mobile devices to transmit messages and data using the wireless communications technologies, such as infrared rays, Bluetooth, 802.11 (Wi-Fi), ZigBee, Ultra Wide Band (UWB), Near Field Communication (NFC), etc.

Bluetooth is a popular wireless communication technology which is utilized in the computers, mobile phones and other electrical devices. However, for traditional Bluetooth settings, the user needs to complete Bluetooth connection by complex Bluetooth pairing settings. The user needs to open multiple windows to establish a Bluetooth pairing between devices by setting the options on the multiple windows. As a result, it is not convenient for the user to use Bluetooth.

BRIEF SUMMARY OF THE INVENTION

A system and method of sleep detection are provided to overcome the problems mentioned above.

An embodiment of the invention provides a method for establishing a Bluetooth connection. The method comprises the steps of generating, by a first electrical device, a first part of a Bluetooth identifier according to a user's name and a Bluetooth network-card address; generating a second part of the Bluetooth identifier according to the first part of the Bluetooth identifier, a private key, and a first algorithm; generating the Bluetooth identifier according to the first part of the Bluetooth identifier and the second part of the Bluetooth identifier; generating a password according to the Bluetooth identifier, the private key and a second algorithm; transmitting, by a second electrical device, a Bluetooth pairing request according to the Bluetooth identifier, the private key, the first algorithm, and the second algorithm; and responding, by the first electrical device, the Bluetooth pairing request to establish a Bluetooth connection with the second electrical device.

An embodiment of the invention provides a system for establishing a Bluetooth connection. The system comprises a first electrical device and a second electrical device. The first electrical device is configured to generate a first part of a Bluetooth identifier according to a user's name, a Bluetooth network-card address, and generate a second part of the Bluetooth identifier according to the first part of the Bluetooth identifier, a private key and a first algorithm. The first electrical device is further configured to generate the Bluetooth identifier according to the first part of the Bluetooth identifier and the second part of the Bluetooth identifier, generate a password according to the Bluetooth identifier, the private key and a second algorithm, and respond a Bluetooth pairing request. The second electrical device is configured to transmit the Bluetooth pairing request to the first electrical device according to the Bluetooth identifier, the private key, the first algorithm, and the second algorithm.

Other aspects and features of the invention will become apparent to those with ordinary skill in the art upon review of the following descriptions of specific embodiments of communication transmission methods and systems

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
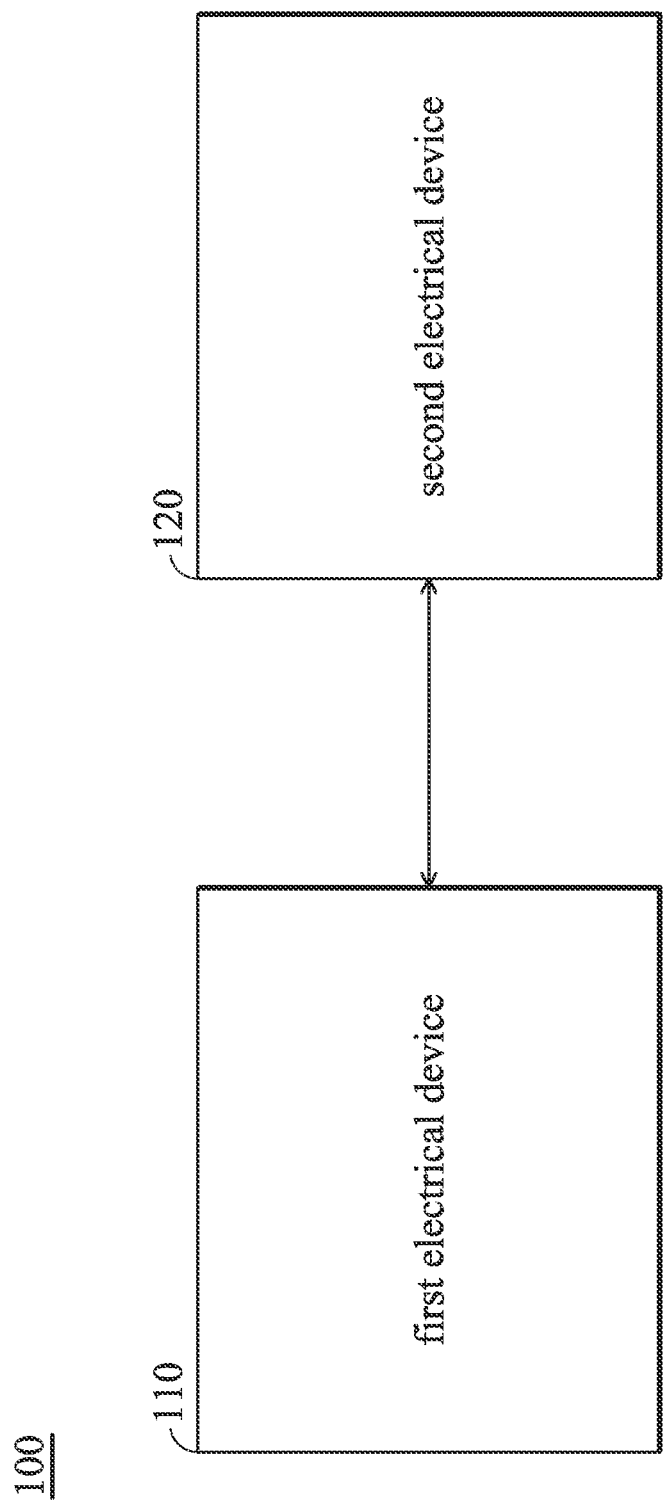
FIG. 1 is block diagram illustrating the system 100 for establishing a Bluetooth connection according to an embodiment of the invention.

FIG. 1 is block diagram illustrating the system 100 for establishing a Bluetooth connection according to an embodiment of the invention. As shown in FIG. 1, the system 100 for establishing a Bluetooth comprises a first electrical device 110 and a second electrical device 120. Note that, in order to clarify the concept of the invention, the first electrical device is regarded as an electrical device which generates the Bluetooth identifier and the second electrical device is regarded as an electrical device which requests the Bluetooth identifier. However, the invention should not be limited thereto. The first electrical device can also be regarded as the electrical device which requests the Bluetooth identifier and the second electrical device can also be regarded as the electrical device which generates the Bluetooth identifier. In addition, in the embodiments of the invention, the Bluetooth can be established with more than two electrical devices. Namely, the number of electrical devices is not limited to two electrical devices (the first electrical device 110 and the second electrical device 120).

The first electrical device 110 and the second electrical device 120 may be user equipment, a wireless device, a mobile phone, a personal communication service (PCS) phone, a cordless phone, a session initiation protocol (SIP) phone, a wireless local loop (WLL) station, a personal digital assistant (PDA), a portable device with wireless link function or a processing device linked with a wireless modem.

Figure 2:
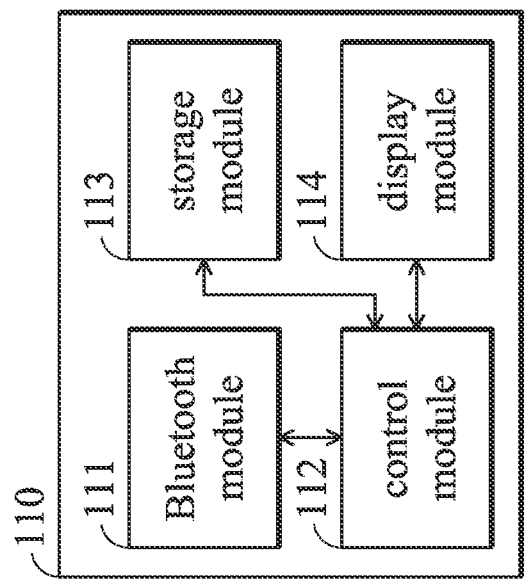
FIG. 2 is block diagram illustrating the first electrical device 110 according to an embodiment of the invention.

FIG. 2 is block diagram illustrating the first electrical device 110 according to an embodiment of the invention. As shown in FIG. 2, the first electrical device 110 comprises a Bluetooth module 111, a control module 112, a storage module 113 and a display module 114.

In an embodiment of the invention, the Bluetooth module 111 is a Bluetooth chip or a Bluetooth network card. The first electrical device can perform a Bluetooth pairing and establish a Bluetooth connection with another electrical device which supports Bluetooth by the Bluetooth module 111.

In an embodiment of the invention, the storage module 113 can be regarded as a memory device (not shown in figures), the memory device may be a volatile memory (e.g. Random Access Memory (RAM)), a non-volatile memory (e.g. flash memory, Read Only Memory (ROM)), a hard disk, or a combination of the above memory devices. In another embodiment of the invention, the storage module 113 also can be an external storage device. The storage module 113 is configured to pre-store a first algorithm, a second algorithm and a private key for the first electrical device 110. In an embodiment of the invention, the first algorithm and the second algorithm may be regarded as an Asymmetric Cryptographic Algorithm (ACA) (e.g. an RSA Cryptographic Algorithm, a Digital Signature Algorithm (DSA), and so on), or a Symmetric Cryptographic Algorithm (e.g. a Data Encryption Standard (DES) algorithm, an Advanced Encryption Standard (AES) algorithm, and so on).

When the first electrical device 110 establishes a Bluetooth connection, the control module 112 of the first electrical device 110 will generate the first part of a Bluetooth identifier according to the user's name and a Bluetooth network-card address, i.e. the first part of the Bluetooth identifier is the first half of the Bluetooth identifier. For example, if the user's name is "Anthony", and the Bluetooth network-card address is "08-1A-7D-DA-71-15", the control module 112 may generate the first part of the Bluetooth identifier according to the user's name, and the last three digits of the Bluetooth network-card address, i.e. the first part of the Bluetooth identifier is represented as "Anthony, DA7115. Note that this example is only used for illustrating the embodiment of the invention", and it is to be understood that the invention is not limited thereto. The control module 112 can also generate the first part of the Bluetooth identifier according to a different method, e.g. selecting the first three digits of the network-card address, or using different symbols, such as a semicolon (;) or exclamation mark (!) to separate the user's name and the network-card address.

After the first part of the Bluetooth identifier is generated, the control module 112 will generate the second part (i.e. the last half of the Bluetooth identifier) of the Bluetooth identifier according to the first part of the Bluetooth identifier, a private key and a first algorithm. Then, the control module 112 may generate the Bluetooth identifier according to the first part and the second part of the Bluetooth identifier.

For example, if the first part of the Bluetooth identifier is "Anthony, DA7115", and the second part of the Bluetooth identifier generated by the first part of the Bluetooth identifier, the private key and the first algorithm is "h&^234S!--$86tg#~d %!", the control module 112 will combine the first part and the second part of the Bluetooth identifier to generate a 32-bit Bluetooth identifier, namely "Anthony, DA7115; h&^234S!--$86tg#~d %!". Note that this example is only used for illustrating the embodiment of the invention, and it is to be understood that the invention is not limited thereto. The control module 112 also can use different symbols, such as a comma (,) or exclamation mark (!) to separate the first part and the second part of the Bluetooth identifier. In an embodiment of the invention, the control module 112 generates a password for the Bluetooth pairing according to the Bluetooth identifier, the privacy key and a second algorithm.

Figure 3:
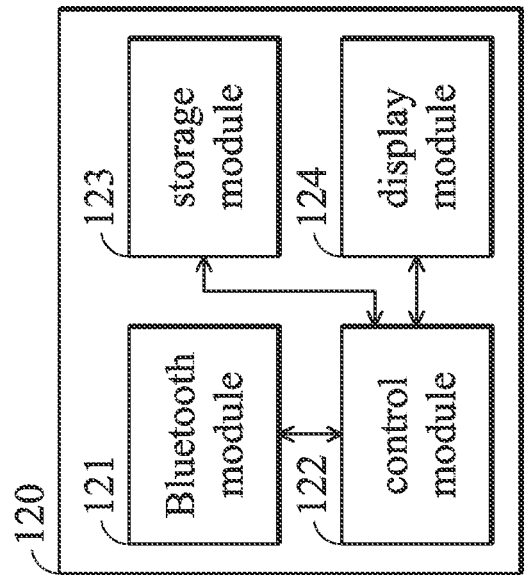
FIG. 3 is block diagram illustrating the second electrical device 120 according to an embodiment of the invention.

FIG. 3 is block diagram illustrating the second electrical device 120 according to an embodiment of the invention. As shown in FIG. 3, the second electrical device 120 comprises a Bluetooth module 121, a control module 122, a storage module 123 and a display module 124.

In an embodiment of the invention, the Bluetooth module 111 is a Bluetooth chip or a Bluetooth network-card. The first electrical device can perform a Bluetooth pairing and establish a Bluetooth connection with another electrical device which supports Bluetooth by the Bluetooth module 111. The storage module 123 similar to storage module 113 is configured to pre-store a first algorithm, a second algorithm and a private key for the second electrical device 120.

When the second electrical device wants to establish a Bluetooth connection with the first electrical device, the control module 122 of the second electrical device 120 will scan all of the Bluetooth identifiers in the network, and filter the scanned Bluetooth identifiers by the private key and the first algorithm to determine whose second part is generated according to the first part from all the scanned Bluetooth identifiers. If the second part of one Bluetooth identifier is generated according to the first part of this Bluetooth identifier, the control module 122 will command the display module 124 to display this service set identifier. If the second part of one Bluetooth identifier is not generated according to the first part of this Bluetooth identifier, the control module 122 will filter out this Bluetooth identifier.

According to the filtered result, the user selects the Bluetooth identifier corresponding to the first electrical device 110 from the display module 124. The control module 122 generates the password according to the Bluetooth identifier corresponding to the first electrical device 110, the private key and the second algorithm. The user doesn't input the password himself. The control module 122 may automatically transmit a Bluetooth pairing request to the first electrical device 110 according to the password. After the electrical device 110 receives the Bluetooth pairing request, the first electrical device will compare the password of the second electrical device 120 with its password first. If the passwords are the same, the first electrical device may respond to the Bluetooth pairing request of the second electrical device 120 to notify the second electrical device 120 that the Bluetooth pairing is successful.

Figure 4:
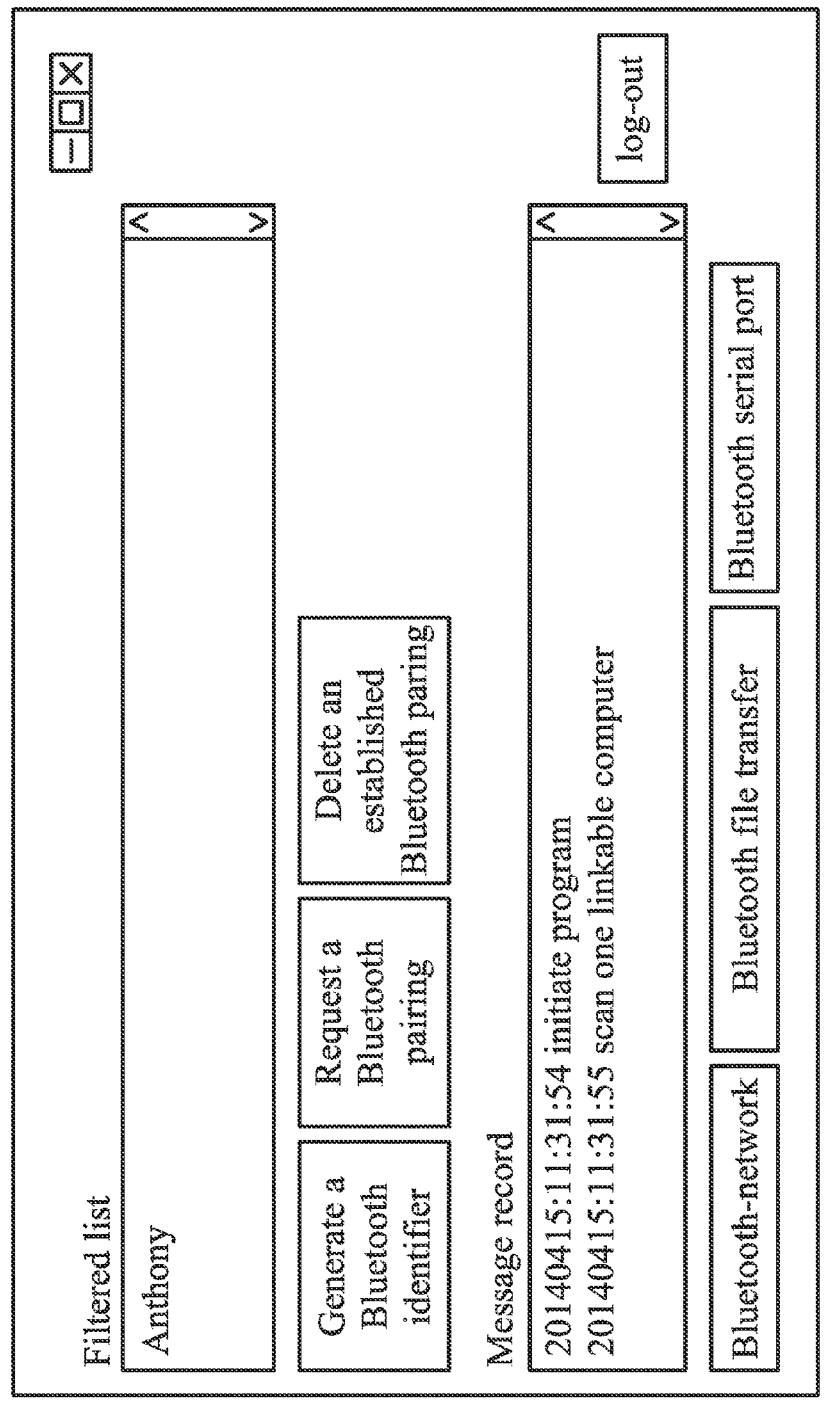
FIG. 4 is a schematic diagram illustrating the display module 114 and the display module 124 according to an embodiment of the invention.

FIG. 4 is a schematic diagram illustrating the display module 114 and the display module 124 according to an embodiment of the invention. As shown in FIG. 4, in an embodiment of the invention, the display module 114 and the display module 124 may display a user interface to provide different options for the user to set and select. In an embodiment of the invention, the control module 112 may determine whether the first electrical device 110 is an electrical device which requests the Bluetooth identifier or an electrical device which generates the Bluetooth identifier according to the settings input by the user on the user interface. The control module 122 may determine whether the second electrical device 120 is an electrical device which requests the Bluetooth identifier or an electrical device which generates the Bluetooth identifier according to the settings input by the user on the user interface. In an embodiment of the invention, the control module 112 and the control module 122 may determine whether the first electrical device 110 and the second electrical device 120 need to generate a Bluetooth identifier, request a Bluetooth pairing, or delete an established Bluetooth pairing according to a setting result of the user on the user interface.

In an embodiment of the invention, when the Bluetooth pairing is successful, the user interface will display at least three Bluetooth service functions. As shown in FIG. 4, the user interface may supply three functions, the Bluetooth-network function, Bluetooth file transfer function, and Bluetooth serial port function, for the user to select from. The Bluetooth-network function can be used to set an IP address automatically. The Bluetooth file transfer function may provide the selectable data on a window. The Bluetooth serial port function can provide a selection screen of the serial ports and set the Bluetooth serial port as a default transmission port.

In an embodiment of the invention, the user interface of the display module 114 and the display module 124 may display the message record of the current connection and display the Bluetooth identifiers corresponding to the electrical devices which can establish a Bluetooth connection with the first electrical device 110 and the second electrical device 120. In an embodiment of the invention, the user interface of the display module 114 and the display module 124 can be operated by the keyboard, the mouse or by the touch of a finger. Note that the user interface shown in FIG. 4 is only used for illustrating the embodiment of the invention, and it is to be understood that the invention is not limited thereto. In different embodiments of the invention, the user interface may have different configurations.

In an embodiment of the invention, the first electrical device 110 and the second electrical device 120 may automatically pre-set their IP addresses. For the first electrical device 110, when the first electrical device 110 establishes the Bluetooth connection, the control module 112 will pre-set a fixed IP address. For the second electrical device, when the second electrical device completes the Bluetooth pairing with the first electrical device 110, the control module 122 will select an IP address to transmit a packet to network to confirm whether the IP address has been used to avoid a conflict of the IP address. If the IP address has been used, the control module 122 may select another IP address. Until confirming that one address has not been used, the control module 122 may select this IP address as the IP address of the second electrical device 120. In an embodiment of the invention, the function of automatically pre-setting the IP address can be initiated by the operation on the user interface of the display module. Taking FIG. 4 for example, the function of automatically pre-setting the IP address can be initiated by selecting the Bluetooth-network function on the user interface of the display module.

In an embodiment of the invention, when using the Bluetooth network, the user can also set the IP address himself via the user interface of the display module 114 and the other display module 124 during a default time. For example, the user interfaces of the display module 114 and display module 124 may display a countdown. In the countdown, the user can decide whether to adjust or set the IP address himself. If the countdown expires, the user doesn't need to perform any operation, and the IP address will be set by the control module 112 and the control module 122.

Figure 5:
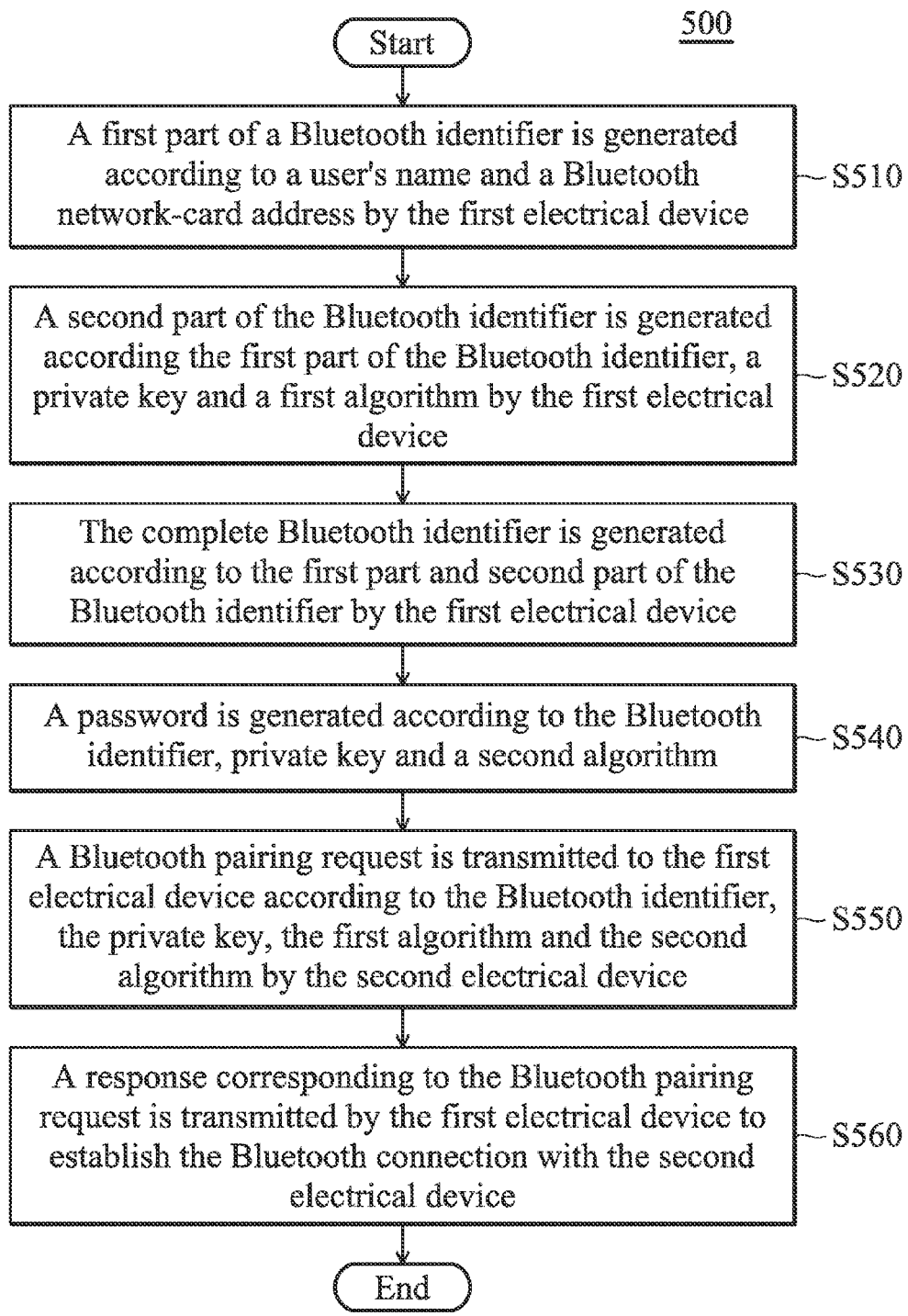
FIG. 5 is a flowchart 500 of a method for establishing a Bluetooth connection according to an embodiment of the invention.

FIG. 5 is a flowchart 500 of a method for establishing a Bluetooth connection according to an embodiment of the invention. The method is applied to the system 100. First, in step S510, a first part of a Bluetooth identifier is generated according to a user's name and a Bluetooth network-card address by the first electrical device 110. In step S520, a second part of the Bluetooth identifier is generated according the first part of the Bluetooth identifier, a private key and a first algorithm by the first electrical device 110. In step S530, the complete Bluetooth identifier is generated according to the first part and second part of the Bluetooth identifier by the first electrical device 110. In step S540, a password is generated according to the Bluetooth identifier, private key and a second algorithm. In step S550, a Bluetooth pairing request is transmitted to the first electrical device 110 according to the Bluetooth identifier, the private key, the first algorithm and the second algorithm by the second electrical device 120. In step S560, a response corresponding to the Bluetooth pairing request is transmitted to the second electrical device 120 by the first electrical device 110 to establish the Bluetooth connection with the second electrical device 120.

Figure 6:
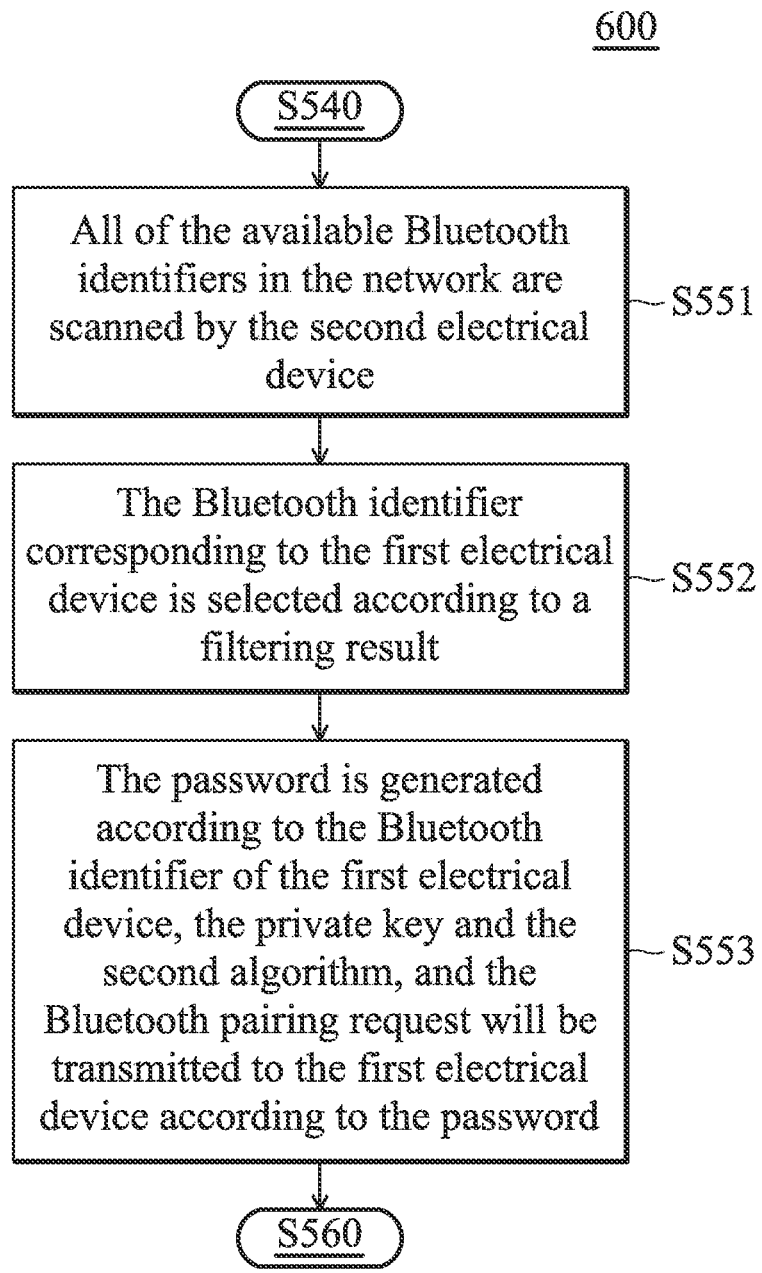
FIG. 6 is a flowchart 600 of step S550 according to an embodiment of the invention.

FIG. 6 is a flowchart 600 of step S550 according to an embodiment of the invention. Step S550 further comprises following steps. In step S551, all of the available Bluetooth identifiers in the network are scanned by the second electrical device 120, and then the scanned Bluetooth identifiers are filtered by the private key and the first algorithm to determine all the scanned Bluetooth identifiers whose second part is generated according to its first part. In step S552, the Bluetooth identifier corresponding to the first electrical device 110 is selected by the second electrical device 120 according to a filtering result. In step S553, the password is generated by the second electrical device 120 according to the Bluetooth identifier of the first electrical device 110, the private key and the second algorithm, and the Bluetooth pairing request will be transmitted to the first electrical device 110 according to the password.

In an embodiment of the invention, the method further comprises the IP addresses of the first electrical device 110 and the second electrical device 120 being set automatically by the first electrical device 110 and the second electrical device 120.

Compared to the traditional method, in the method for establishing a Bluetooth connection of the invention, the user doesn't need to open multiple windows to set the Bluetooth options. The Bluetooth connection can be established only through the operation of the user on a simple user interface. In addition, when the user wants to terminate the Bluetooth, the user can delete the established Bluetooth pairing by the user interface directly to save the power of the electrical device.

In addition, in the method for establishing a Bluetooth connection of the invention, the user doesn't need to set the Bluetooth identifier and input link password. The Bluetooth identifier can be generated by the user's name, Bluetooth network-card address, private key and algorithm. Therefore, the Bluetooth identifier will be different from other Bluetooth identifiers of other electrical devices. Therefore, it becomes more easy and rapid for the user to find and select the desired Bluetooth identifier.

In addition, in the method for establishing a Bluetooth connection of the invention, the user doesn't install the Dynamic Host Configuration Protocol (DHCP) server to provide the IP to the electrical device. The electrical device can automatically set a fixed IP address and resolve the problem of conflicting IP addresses.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but does not denote that they are present in every embodiment. Thus, the appearance of the phrases "in one embodiment" or "in an embodiment" in various places throughout this specification are not necessarily referring to the same embodiment of the invention.

The above paragraphs describe many aspects of the invention. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for establishing a Bluetooth connection, comprising:
   generating, by a first electrical device, a first part of a Bluetooth identifier according to a user's name and a Bluetooth network-card address;
   generating a second part of the Bluetooth identifier according to the first part of the Bluetooth identifier, a private key, and a first algorithm;
   generating the Bluetooth identifier according to the first part of the Bluetooth identifier and the second part of the Bluetooth identifier;
   generating a password according to the Bluetooth identifier, the private key and a second algorithm;
   transmitting, by a second electrical device, a Bluetooth pairing request according to the Bluetooth identifier, the private key, the first algorithm, and the second algorithm; and
   responding, by the first electrical device, the Bluetooth pairing request to establish the Bluetooth connection with the second electrical device.

2. The method of claim 1, further comprising:
   scanning all of the Bluetooth identifiers in a network;
   filtering the scanned Bluetooth identifiers, by the second electrical device, to determine all the scanned service set identifiers whose second part is generated according to its first part according to the private key and the first algorithm;
   selecting the Bluetooth identifier corresponding to the first electrical device from the Bluetooth identifiers; and
   generating the password according to the Bluetooth identifier of the first electrical device, the private key and the second algorithm to trans transmit the Bluetooth pairing request to the first electrical device.

3. The method of claim 1, wherein the first part and the second part of the Bluetooth identifier are separated by a semicolon.

4. The method of claim 1, further comprising:
   setting an IP address for the first electrical device and the second electrical device automatically.

5. The method of claim 1, further comprising:
   determining whether to generate the Bluetooth identifier, request a Bluetooth pairing, or delete an established Bluetooth pairing by a user interface.

6. A system for establishing a Bluetooth connection, comprising:
   a first electrical device, configured to generate a first part of a Bluetooth identifier according to a user's name, a Bluetooth network-card address, generate a second part of the Bluetooth identifier according to the first part of the Bluetooth identifier, a private key and a first algorithm, generate the Bluetooth identifier according to the first part of the Bluetooth identifier and the second part of the Bluetooth identifier, generate a password according to the Bluetooth identifier, the private key and a second algorithm, and respond a Bluetooth pairing request; and
   a second electrical device, configured to transmit the Bluetooth pairing request to the first electrical device according to the Bluetooth identifier, the private key, the first algorithm, and the second algorithm.

7. The system of claim 6, wherein the second electrical device further filters all scanned Bluetooth identifiers by determining for the scanned Bluetooth identifiers whose the second part of the Bluetooth identifier is generated according to the first part of the Bluetooth identifier by the private key and the first algorithm, selects the Bluetooth identifier corresponding to the first electrical device according to the filtered Bluetooth identifiers; and generates the password according to the Bluetooth identifier of the first electrical device, the private key and the second algorithm to transmit the Bluetooth pairing request to the first electrical device.

8. The system of claim 6, wherein the first part and the second part of the Bluetooth identifier are separated by a semicolon.

9. The system of claim 6, wherein user interfaces of the first electrical device and the second electrical device are configured to provide a plurality of Bluetooth service functions after the first electrical device and the second electrical device have established Bluetooth.

10. The system of claim 9, wherein the first electrical device and the second electrical device determine whether to generate the Bluetooth identifier, request a Bluetooth pairing or delete an established Bluetooth pairing according to a selected result on the user interface.

\* \* \* \* \*